United States Patent
Rubenstein et al.

(10) Patent No.: US 6,556,449 B2
(45) Date of Patent: Apr. 29, 2003

(54) BACKPLANE ASSEMBLY WITH EJECTION MECHANISM

(75) Inventors: Brandon A Rubenstein, Loveland, CO (US); Wallace K Johnson, American Fork, UT (US); Bradley E. Clements, Ft. Collins, CO (US)

(73) Assignee: Hewlett Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/920,584

(22) Filed: Aug. 1, 2001

(65) Prior Publication Data

US 2003/0026080 A1 Feb. 6, 2003

Related U.S. Application Data

(63) Continuation-in-part of application No. 09/918,975, filed on Jul. 31, 2001.

(51) Int. Cl.[7] .............................. H05K 5/02; H05K 7/16
(52) U.S. Cl. ...................... 361/754; 361/796; 361/797; 361/798; 361/726; 361/724
(58) Field of Search .................................. 361/796–798, 361/683, 724–727, 754; 312/223.2, 351.6; 211/41.17; 174/50

(56) References Cited

U.S. PATENT DOCUMENTS

| | | | | |
|---|---|---|---|---|
| 4,954,928 A | * | 9/1990 | Jullien | 361/391 |
| 5,351,176 A | * | 9/1994 | Smith et al. | 361/681 |
| 5,398,161 A | * | 3/1995 | Roy | 361/727 |
| 6,061,250 A | * | 5/2000 | Lavan | 361/797 |
| 6,134,116 A | * | 10/2000 | Hoss et al. | 361/747 |

* cited by examiner

Primary Examiner—David Martin
Assistant Examiner—Dameon E. Levi

(57) ABSTRACT

The present invention is directed to a network chassis having a system backplane board, a subassembly backplane board, and at least one connector disposed on each of the system backplane board and subassembly backplane board for electrically connecting the system backplane board to the subassembly backplane board. The chassis includes a mounting mechanism for rotatably coupling the system backplane board to the chassis and defining a path of rotation therefor, and an ejection mechanism mounted to the system backplane board to unseat the connector of the system backplane board from the connector of the subassembly backplane board. The ejection mechanism selectively exerts a force against the chassis that is directed linearly outwardly from and perpendicularly to the system backplane board. The ejection mechanism further comprises a fastener for releasably engaging the system backplane board to the chassis. The system backplane board includes a span extending between the mounting mechanism and the ejection mechanism. The span is selected such that the path of rotation for the system backplane board for a distance sufficient to unseat the system backplane board connector from the subassembly backplane board connector is substantially linear.

15 Claims, 4 Drawing Sheets

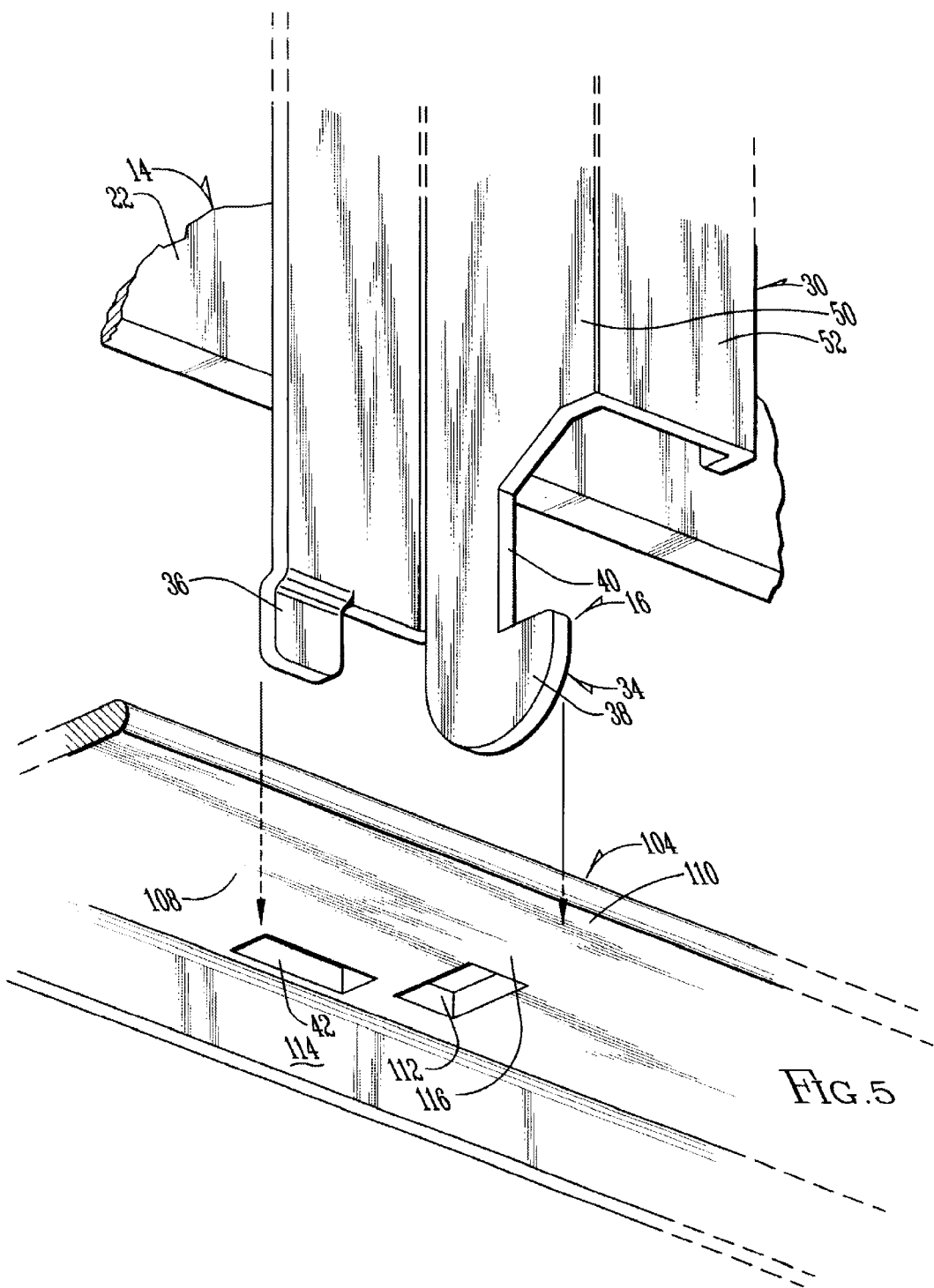

BACKPLANE ASSEMBLY WITH EJECTION MECHANISM

RELATED APPLICATION

The present application is a continuation-in-part of U.S. application Ser. No. 09/918,975 filed Jul. 31, 2001 and entitled Backplane Assembly With Ejection Mechanism.

FIELD OF INVENTION

This invention relates to electronic equipment such as computers, and more particularly to a backplane assembly for an electronic system chassis wherein the backplane assembly incorporates an ejection mechanisms for detaching a connector of the system backplane assembly from a connector of a subassembly backplane board within the electronic system.

BACKGROUND OF THE INVENTION

The backplane board is typically a face-plate of one-piece, integral construction with a specific arrangement of connectors for releasable interconnection with mating connectors of a circuit card. Typically, before inserting the circuit cards into the backplane, the cards are physically mounted on a suitably high front panel. Afterwards, the card/panel assembly forms an integral unit, with the connectors for coupling the cards to the backplane usually mounted on the rear edges of the cards. The card/panel assembly maintains the connectors in registration with the mating connectors of the backplane.

Further, computer systems may have more than one data communications busses that are connected to the backplane board. For example, computers may have a peripheral component interconnect (PCI) bus for communications with peripheral interface cards, one or more processor busses interfacing to each processor, and busses of other types. Complex systems utilize a system management bus to provide an interface between the busses and system functions. This system management bus is electrically connected to the backplane board through a connector.

It may become necessary to reconfigure the computer by replacing, removing, or adding components. Presently, in order to replace or add a component of the computer, appreciable time and effort is involved disassembling the card/panel assembly, removing the backplane board by unseating the mounting hardware, and disassembling a number of components or subchassis parts mounted to the backplane board, including the connection between the system backplane board and the system management backplane.

Removal of the mounting hardware typically requires loosening or removal of several fasteners or screws and the manipulation of the affected component to separate it from the backboard and chassis. The disconnection of connectors, such as the connection between the backplane board and the system management or PCI backplane presents particular problems in that such connectors are often difficult to disconnect because of the tight tolerances between the connectors to prevent their inadvertent disconnection. Further, the disconnection of connectors from the backplane board is likewise frequently complicated because of the awkward positioning of the connectors within the chassis.

The new or repaired computer component must be manipulated into place within the chassis and aligned properly in order to be installed correctly. Misalignment of the component typically results in an inability to properly re-install the backboard plane and, if forced to reconnect, mechanical and electrical damage to the computer is likely. The reconnection of the electrical connectors and components to the backboard plane is commonly complicated by the limited space available for the manipulation thereof. After reconfiguring the computer, the components and electrical connectors must be reattached to the backplane board and the mounting hardware must be reinstalled.

It is crucial that the disconnection, alignment, and reconnection processes be performed correctly to avoid damage to the connector as well as to nearby computer components. Additionally, it is crucial that connections be made among the proper connectors. It is often possible to make connection between the wrong connectors, thus possibly resulting in damage to the computer.

As can be appreciated, some degree of mechanical ability is therefore required for the removal of the backplane board and the replacement of particular computer components within the chassis. Thus, there exists in the art a substantial need for a means for conveniently removing the backplane board and facilitating the reconnection of the components to the backplane board. Therefore, it would be desirable to reduce the time and effort required to repair or reconfigure a computer by providing quick and simple access to internal components thereof.

SUMMARY OF THE INVENTION

It is therefore an object of the present invention to provide a system backboard assembly that is easily removable from the chassis. It is a further object of the present invention to have a system backplane assembly that includes an ejection mechanism for disengaging connectors of the system backplane board from connectors of subassembly backplane boards, such as PCI backplane boards. It is yet another object of the present invention to have a system backplane assembly that is releasably mounted to the chassis.

These and other objects are afforded by the present invention providing a chassis having a system backplane board, a subassembly backplane board, and at least one connector disposed on each of the system backplane board and subassembly backplane board for electrically connecting the system backplane board to the subassembly backplane board. The chassis comprises a mounting mechanism for rotatably coupling the system backplane board to the chassis and defining a path of rotation for the system backplane board, and an ejection mechanism mounted to the system backplane board to unseat the connector of the system backplane board from the connector of the subassembly backplane board. The ejection mechanism selectively exerts a force against the chassis that is directed linearly outwardly from and perpendicularly to the system backplane board. The ejection mechanism further comprises a fastener for releasably engaging the system backplane board to the chassis.

The system backplane assembly includes a span extending between the mounting mechanism and the ejection mechanism. The span is selected such that the path of rotation for the system backplane board for a distance sufficient to unseat the system backplane board connector from the subassembly backplane board connector is substantially linear.

The method of the present invention likewise meets these objects by selectively electrically connecting a system backplane board to a subassembly backplane board of a chassis and disengaging the system backplane board from the subassembly backplane board. The method comprises the steps of: coupling the base region of a system backplane board to a chassis frame such that the system backplane board is rotatably mounted to the frame and is movable from a closed position to an open position; aligning a connector of the system backplane board in a horizontal plane with a connector of the subassembly backplane board; rotating the system backplane board upward to align the connector of the system backplane board with the connector of the subassembly backplane board; and manipulating a fastener mechanism mounted to the system backplane board to seat the connector of the system backplane board with the connector of the chassis board.

It can thus be seen that the invention allows reconfiguration of the electrical equipment in an efficient and economical manner. The invention also facilitates electrical connection between edge-mounted connectors on the subassembly backplane boards and the corresponding connectors of a system backplane board.

Other advantages and components of the present invention will become apparent from the following description taken in conjunction with the accompanying drawings, which constitute a part of this specification and wherein are set forth exemplary embodiments of the present invention to illustrate various objects and features thereof.

BRIEF DESCRIPTION OF THE DRAWINGS

FIG. 5 is a perspective view of the pivotal mount between the system backplane assembly and the chassis.

DETAILED DESCRIPTION OF THE PREFERRED EMBODIMENT

Figure 1:
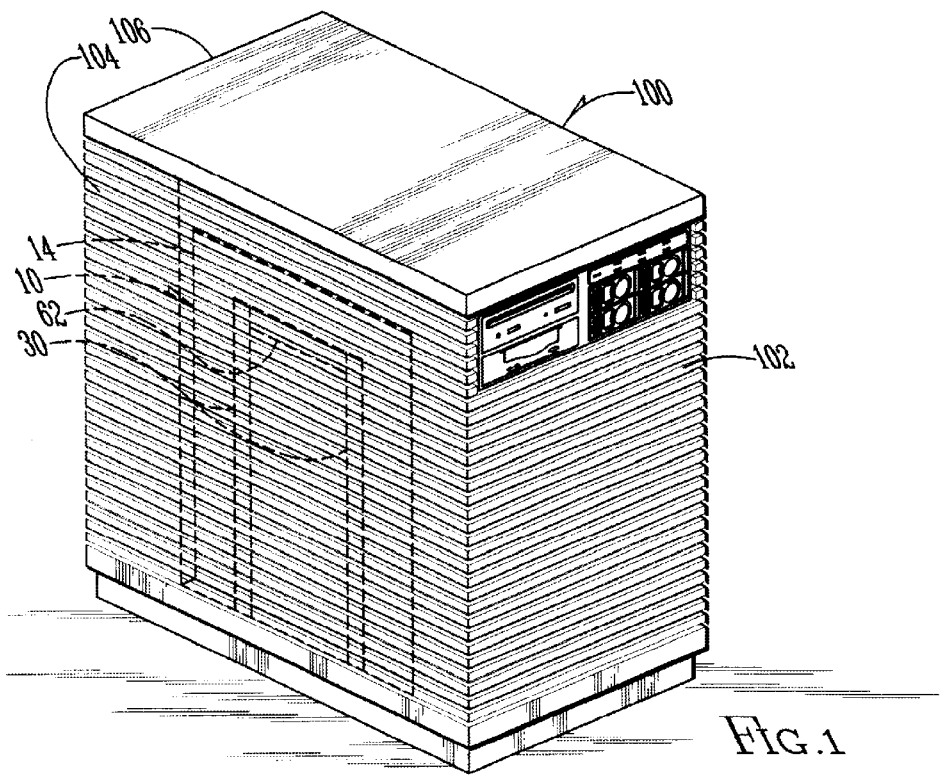
FIG. 1 is a perspective view showing a network chassis in accordance with the present invention.
Figure 2:
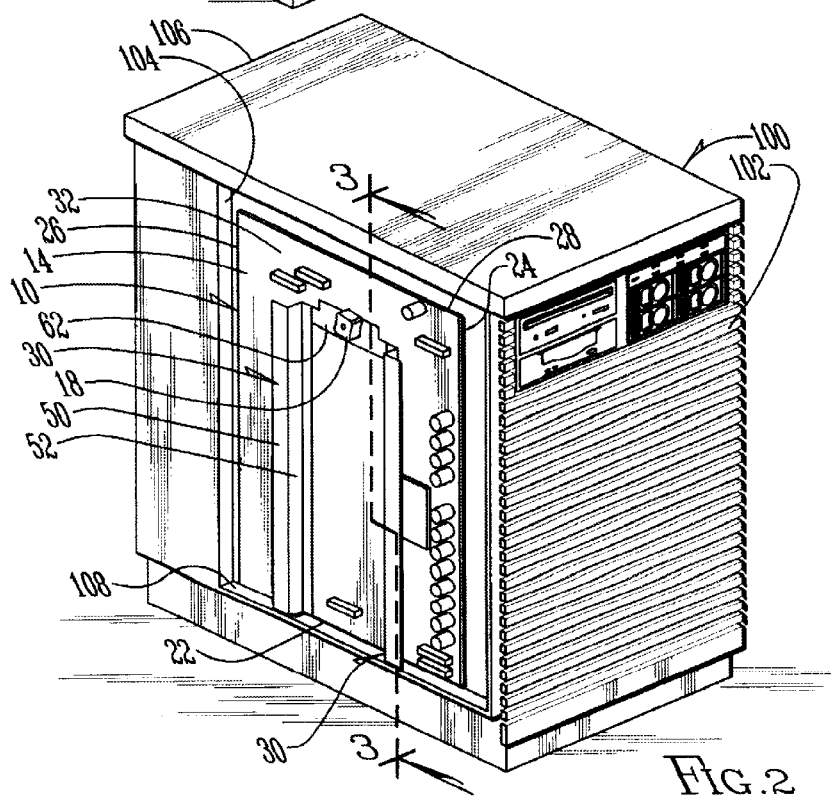
FIG. 2 is a perspective view showing the system backplane board mounted to the chassis in a closed position.
Figure 3:
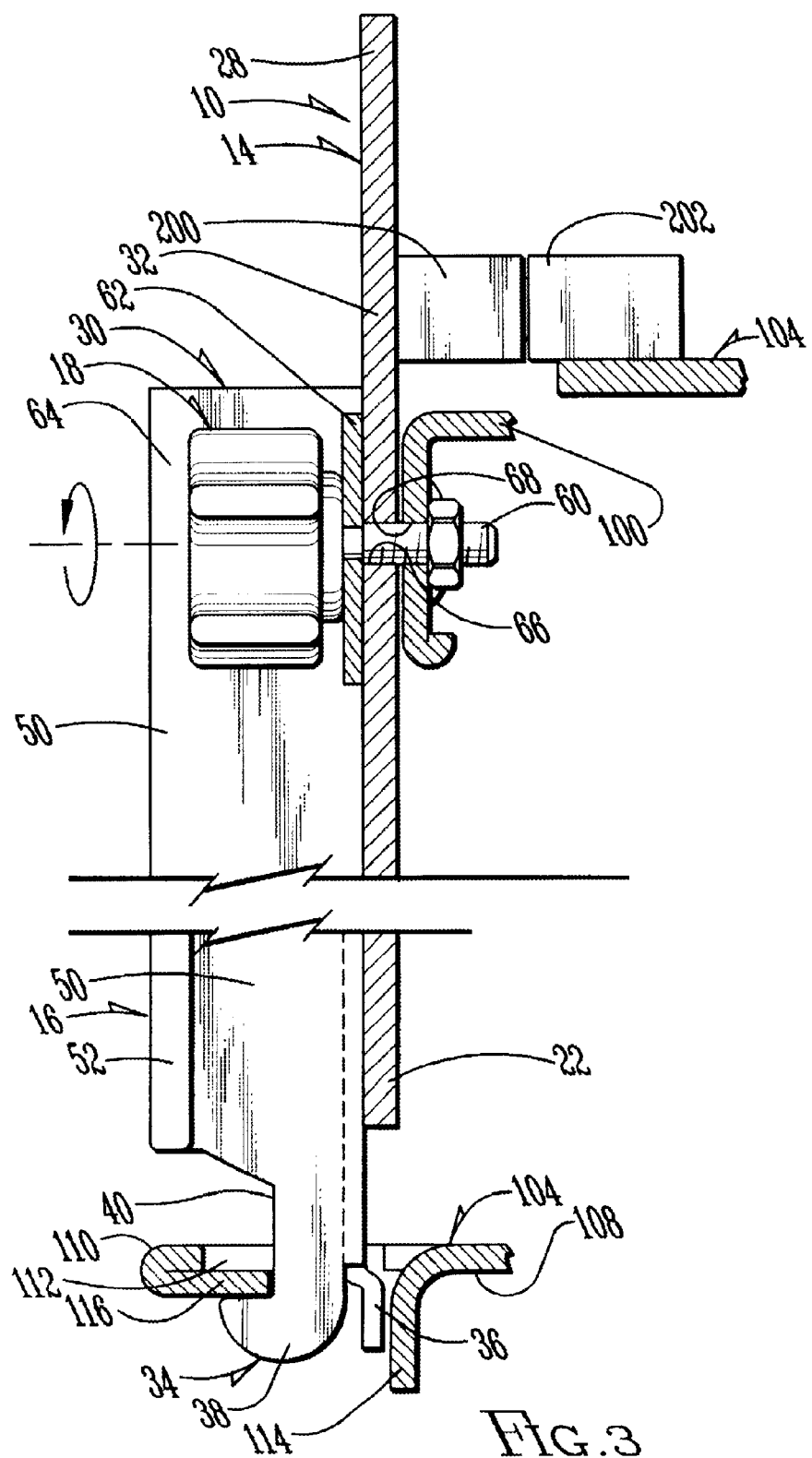
FIG. 3 is a side elevational view showing the ejector mechanism of the system backplane assembly in a closed position.
Figure 4:
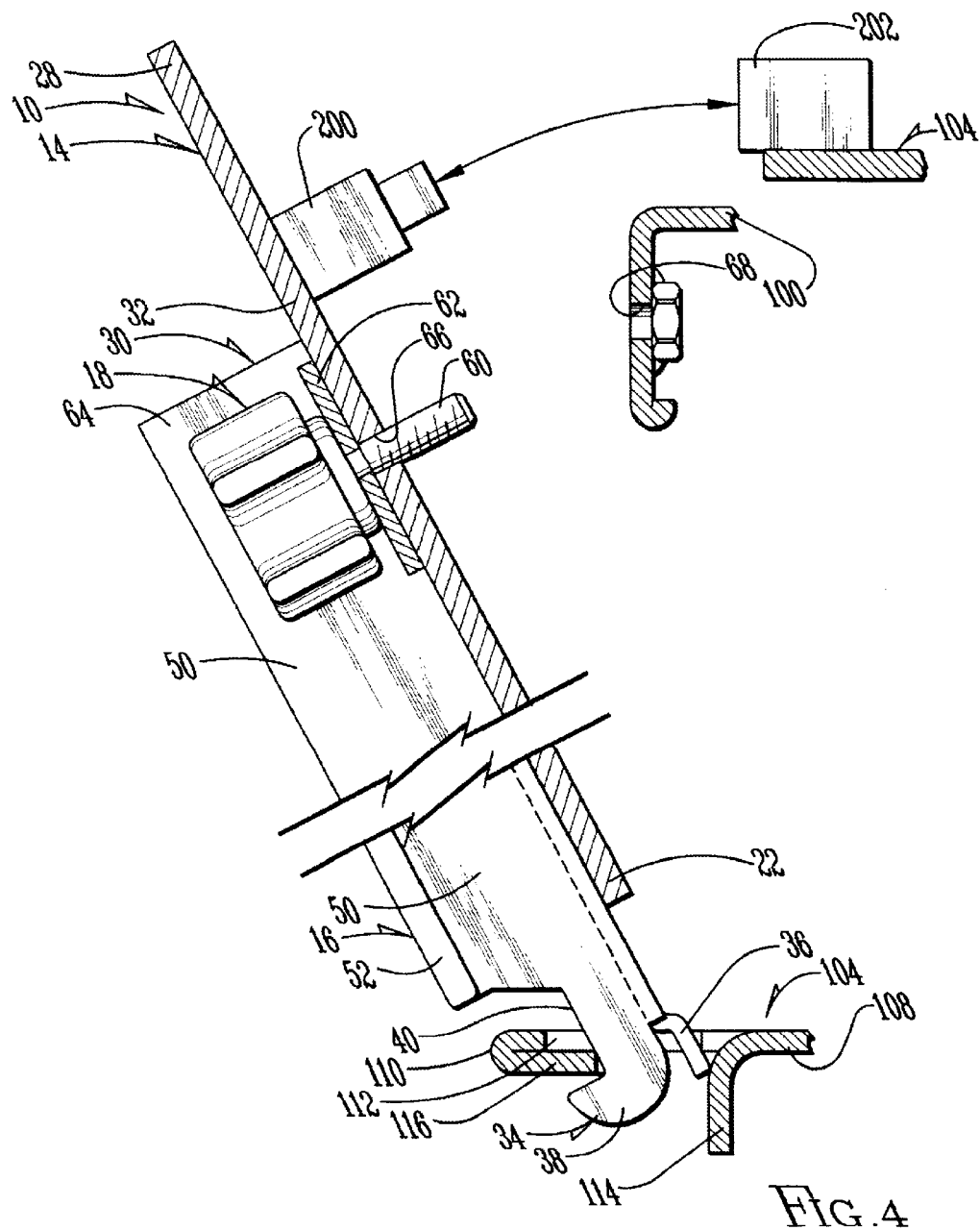
FIG. 4 is a side elevational view showing the ejector mechanism of the system backplane assembly in an open position.

FIGS. 1 and 2 show an exemplary network server chassis 100 according to the invention. It is noted that no electronic components or circuit cards are shown attached to the system backplane board in FIGS. 1 and 2. They have been omitted to allow the computer chassis, and more particularly, the system backplane assembly 10 in accordance with the present invention to be shown more clearly. The chassis 100 generally includes a front end 102, first and second side walls 104, respectively, and a back end 106. The system backplane assembly 10 may be mounted to any side of the chassis, and is preferably mounted to the side wall 104. The system backplane assembly 10 is electrically connected to a PCI or subassembly backplane board located internally of the chassis.

The system backplane assembly includes a system backplane board 14, a pivotal mount 16 to pivot the system backplane board from a first, engaged position to a second, disengaged position, and an ejection mechanism 18 for unseating the system backplane board connector 200 from a connector 202 of the subassembly backplane board. The system backplane assembly 10 further includes multiple connectors mounted on the system backplane board 14 for electrical connection to other peripheral devices.

The system backplane board 14 preferably is generally a rectangularly shaped, planar member, and includes a bottom edge 22, opposing side edges 24, 26, respectively, and an upper edge 28. The system backplane board 14 may be configured with alignment pins (not shown) mateably received by alignment slots (not shown) in the chassis, as will be explained further hereinafter. The system backplane board 14 further includes at least one reinforcing member 30 extending longitudinally along the system backplane from its bottom edge 22 to an upper region 32 thereof for increased stability and rigidity. Preferably, a pair of substantially parallel reinforcing members 30 are mounted to the system backplane board 14, each reinforcement member having a hinge blade 34 and an alignment blade 36 extending from a bottom portion 38 thereof. Each hinge blade 34 preferably includes a nose portion 38 and a recess 40 for hingedly mounting the system backplane.

The system backplane board 14 is pivotally mounted to a wall of the chassis, such as the side wall 104 shown in FIG. 2. The side wall 104 of the chassis includes a generally horizontal floor 110 for mounting the system backplane thereto. This floor 110 includes corresponding openings 42 for the hinge blade 34 and the alignment blade 36 for each reinforcing member 30 for mateably receiving the hinge blade and alignment blade. The opening 112 for the hinge blade is configured to receive the nose portion 38 of the hinge blade below a recessed member 116 therein. The opening 42 for the alignment blade 36 mateably receives the alignment blade and includes a downwardly extending projection 114, which forces the backplane slightly outwardly from the interior of the chassis to tightly seat the nose portion 38 of each hinge blade in its corresponding opening 112.

The reinforcement members 30 and the hinge blades 34 may be configured such that when the system backplane board 14 is in its open position, the system backplane board lies substantially flat against the floor 110 of the side wall 104. The alignment member 36 of each reinforcement member further engages a supporting surface 108 of the side wall to limit rotation of the system backplane board beyond horizontal. Such a configuration allows the interior of the chassis to be accessed conveniently. To facilitate the movement of the system backplane board 14 to its open position, the hinge blades 34 are configured such that recess 40 of the hinge blades receives a portion 110 of the side wall to permit the system backplane board to pivot to its open position.

Each reinforcement member 30 preferably includes a raised portion 50 extending outwardly away from the system backplane board and presenting an abutment surface 52 extending substantially the length of the reinforcement member. The abutment surface 52 prevents the motherboard from contacting an object and further provides an area to grasp the motherboard assembly.

The ejection mechanism 18 of the system backplane assembly comprises a selectively releasable screw 60 mounted to the system backplane board 14 and the chassis 100. Preferably, the reinforcement members 30 are interconnected by a generally planar cross member 62 that is mounted to each reinforcement member 30 on a top portion 64 thereof. The releasable screw 60 is mounted to cross member 62. Preferably the ejection mechanism 18 comprises a jackscrew mounted in a central portion of cross member 62. The jackscrew 60 extends through a bore 66 of the cross member 62 and system backplane board, and is mateably received in a grooved bore 68 of the chassis 100. The jackscrew 60 is positioned such that as the system backplane board 14 is in its closed position, the jackscrew engages the bore 68 of the chassis 100 and thus securely retains the system backplane board 14 to the chassis.

Twisting the jackscrew 60 in a direction to unscrew the jackscrew from the chassis exerts a substantially linear force against the chassis. This force is sufficient to unseat the electrical connector of the system backplane board, which was press fit into the mateable connector of the subassembly backplane board.

The mateable connectors 200, 202 of the system backplane board 14 and the subassembly backplane board, such as the PCI backplane, have strict tolerances. Thus, the unseating of the connectors 200, 202 through the jackscrew 60 must be substantially linear and directed outwardly of the system backplane board. Thus, the hinged connection between the system backplane board and the chassis, and the location of the connectors must be sufficiently spaced a span such that a path of rotation for the system backplane for the distance required to unseat the connectors 200, 202 is substantially linear. The span is preferably greater than approximately 20 inches, and more preferably in the range of 28 to 32 inches. Most preferably, the span between the hinged connection of the system backplane board and the chassis and the location of the connectors between the system backplane board and the PCI backplane is approximately 30 inches.

In operation, the system backplane assembly 10 of the present invention is mounted to the network server chassis and securely retained therein by the jackscrew mount. As it becomes necessary to reconfigure the computer by replacing, removing, or adding components internal of the chassis, the jackscrew 60 is rotated, which causes a force to be exerted against the chassis 100. This force is sufficient to disengage the socket connector 200 of the system backplane board 14 from the mating pin connector 202 of the PCI board. The system backplane assembly 10 is then pivoted to the open position for reconfiguring or repairing the internal components of the chassis.

The hinged mount 16 likewise secures the path of rotation for the system backplane assembly such that as the system backplane assembly is pivoted from the open position to the closed position, the alignment pins of the system backplane assembly mate with the slots of the chassis such that the pin and socket connectors for the subassembly backplane board and the system backplane board, respectively, are mated. The jackscrew is then tightened to securely retain the system backplane to the chassis.

From the forgoing information, it should now be obvious that the system backplane assembly 10 of the present invention provides a convenient and reliable solution for disengaging a system backplane from a network chassis. The assembly 10 provides a simple and repeatable method for accessing the interior of the chassis without damaging connectors or components therein. It is to be understood that the ejection mechanism can have a number of configurations so long as it provides sufficient leverage to unseat the connection between the pin and socket connectors.

The invention thus attains the objects set forth above and those apparent from the preceding description. Since certain changes may be made in the above systems and methods without departing from the scope of the invention, it is intended that all matter contained in the above description or shown in the accompanying drawing be interpreted as illustrative and not in a limiting sense.

What is claimed is:

1. A chassis having a system backplane board, a subassembly backplane board, and at least one connector disposed on each of the system backplane board and subassembly backplane board for electrically connecting the system backplane board to the subassembly backplane board, the chassis comprising:

mounting means for rotatably coupling the system backplane board to the chassis, the mounting means defining a path of rotation for the system backplane board, the mounting means comprising a pivotal hinge extending from a lower edge of the system backplane board, and a slot formed in a wall of the chassis for mateably receiving the hinge at least one reinforcing member mounted to the system backplane board, the at least one reinforcing member having the pivotal hinge extending downwardly therefrom, an ejection mechanism mounted to the system backplane board to unseat the connector of the system backplane board from the connector of the subassembly backplane board, the ejection mechanism selectively exerting a force against the chassis substantially linearly outwardly from and generally perpendicular to the system backplane board, the ejection mechanism further comprising a fastener for releasably engaging the system backplane board to the chassis, and a span extending between the mounting means and the ejection mechanism, the span being selected such that the path of rotation for the system backplane board for a distance sufficient to unseat the connector of the system backplane board from the connector of the subassembly backplane board is substantially linear.

2. The chassis of claim 1 wherein the at least one reinforcing member mounted to the system backplane board comprises two reinforcing members, the two reinforcing members being spaced and extending in substantial parallel alignment from the lower edge of the system backplane board to an upper region thereof.

3. The chassis of claim 2 wherein the two reinforcing members are interconnected by a cross member, the cross member extending between upper portions of the reinforcing members.

4. The chassis of claim 3, wherein the ejection mechanism is mounted to the cross member.

5. The chassis of claim 4, wherein the cross member further comprises a threaded bore, and wherein the ejection mechanism comprises a jackscrew threadably receivable in the bore.

6. The chassis of claim 5, wherein the chassis includes a frame and the frame includes a threaded bore aligned with the bore of the cross member as the system backplane board is pivoted to a closed position.

7. A chassis having a system backplane board, a subassembly backplane board, and at least one connector disposed on each of the system backplane board and subassembly backplane board for electrically connecting the system backplane board to the subassembly backplane board, the chassis comprising:

mounting means for rotatably coupling the system backplane board to the chassis, the mounting means defining a path of rotation for the system go backplane board, an ejection mechanism mounted to the system backplane board to unseat the connector of the system backplane board from the connector of the subassembly backplane board, the ejection mechanism selectively exerting a force against the chassis substantially linearly outwardly from and generally perpendicular to the system backplane board, the ejection mechanism further comprising a fastener for releasably engaging the system backplane board to the chassis, and a span comprising a length of between about 18 inches and about 36 inches extending between the mounting means and the ejection mechanism, the span being selected such that the path of rotation for the system backplane board for a distance sufficient to unseat the connector of the system backplane board from the connector of the subassembly backplane board is substantially linear.

8. The chassis of claim 7, wherein the span comprises a length between about 24 inches and about 32 inches.

9. The chassis of claim 7, wherein the span comprises a length of approximately 30 inches.

10. An apparatus comprising:

a chassis, a sub-assembly backplane board having a connector, a system backplane board having a connector mateably received by the connector of the sub-assembly backplane board, the system backplane board being pivotally mounted to the chassis at a mounting edge of the system backplane board to define a path of rotation for the system backplane board between a position wherein the sub-assembly backplane board and system backplane board are electrically connected and a position wherein the sub-assembly backplane board is accessible, an ejection mechanism mounted to the system backplane board to unseat the system backplane connector from the sub-assembly backplane board connector, the ejection mechanism selectively exerting a force against the chassis substantially linearly outwardly from and generally perpendicular to the system backplane board, the ejection mechanism further comprising a fastener for releasably engaging the system backplane board to the chassis, and a span extending between the mounting edge of the system backplane board and the ejection mechanism, the span being selected such that the path of rotation for the system backplane board is substantially linear for a distance sufficient to unseat the system backplane board connector from the subassembly backplane board.

11. The apparatus of claim 10 wherein the system backplane board comprises a pivotal hinge at the mounting edge and wherein the chassis comprises a slot formed in a wall of the chassis for mateably receiving the hinge.

12. The chassis of claim 10, wherein the ejection mechanism comprises a jackscrew configured to be threadably received in a threaded bore extending through the system backplane board and a frame of the chassis, whereby rotation of the jackscrew as engaged in the bore of the chassis exerts a force against the chassis, the force being directed linearly outwardly of the system backplane board.

13. The chassis of claim 10, wherein the subassembly backplane board is a PCI backplane board.

14. A method for selectively electrically connecting a system backplane board to a subassembly backplane board of a chassis and disengaging the system backplane board from the subassembly backplane board, the method comprising the steps of:

coupling a system backplane board to a chassis frame such that the system backplane board is rotatably mounted to the frame at a bottom edge of the system backplane board and is movable from a closed position to an open position;

aligning a connector of the system backplane board in a horizontal plane with a connector of the subassembly backplane board by rotating the system backplane board upwardly;

manipulating a fastener mechanism mounted to the system backplane board to seat the connector of the system backplane board with the connector of the subassembly backplane board.

15. The method of claim 14 further including the step of:

disengaging the fastener mechanism, the fastener mechanism being configured to exert a force generally directed linearly outwardly of the system backplane board, the disengaging of the fastener mechanism further causing the connector of the system backplane board to detach from the connector of the subassembly backplane board.

* * * * *

UNITED STATES PATENT AND TRADEMARK OFFICE
CERTIFICATE OF CORRECTION

PATENT NO. : 6,556,449 B2
DATED : April 29, 2003
INVENTOR(S) : Brandon A. Rubenstein et al.

It is certified that error appears in the above-identified patent and that said Letters Patent is hereby corrected as shown below:

Column 6,
Line 55, after "system" delete "go"

Signed and Sealed this

Nineteenth Day of October, 2004

JON W. DUDAS
*Director of the United States Patent and Trademark Office*